Dec. 16, 1947.  R. W. ROSENDALE  2,432,631
METHOD OF ELECTRIC WELDING METALS OF DIFFERENT ELECTRICAL RESISTIVITIES
Filed July 28, 1945

INVENTOR
R.W. ROSENDALE
BY
W.C. Parnell
ATTORNEY

Patented Dec. 16, 1947

2,432,631

UNITED STATES PATENT OFFICE 2,432,631

METHOD OF ELECTRIC WELDING METALS OF DIFFERENT ELECTRICAL RESISTIVITIES

Robert W. Rosendale, Westfield, N. J., assignor to Western Electric Company, Incorporated, New York, N. Y., a corporation of New York Application July 28, 1945, Serial No. 607,649

2 Claims. (Cl. 219—10)

This invention relates to a method of welding metals together, and more particularly to the preparation of metals having low electrical resistance values, such as brass, for welding.

In spot welding, the time required to effect the weld depends on the resistance of the metal being welded. For this reason ferrous metals such as steel may be welded rapidly without much difficulty. On the other hand, non-ferrous metals such as brass have such low resistance that it is difficult to raise them to welding temperature in a reasonable time since the power dissipated in the material is relatively low.

The principal object of this invention is to provide a rapid and practical method for preparing low resistance members for welding. According to this invention, the required slugs are made and positioned in a very simple and expeditious manner by placing a high resistance strip above one of the low resistance elements to be welded, and punching slugs from strip into the member so that slugs are removed entirely from the member and replaced by slugs of high resistance. In the punching operation the high resistance slugs are preferably moved into a final position where their leading surfaces extend slightly beyond the adjacent surface of the member. When so positioned, these slugs act as spacers between the two low resistance members to be welded together, and thereby concentrate the welding current and the resulting heat in the slug and the immediately adjacent portions of the members where fusion is desired.

Figure 1:
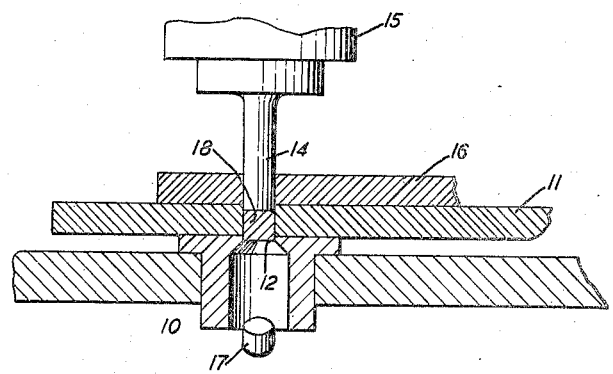
Figure 2:
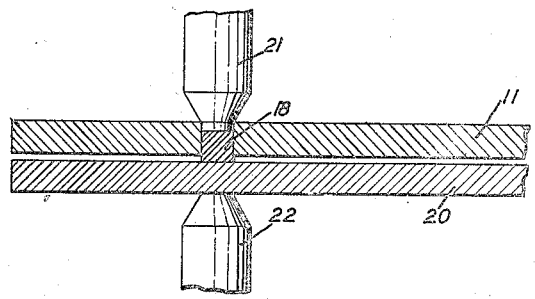
Figure 3:
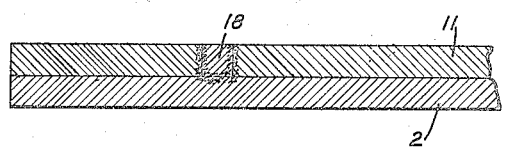

Other objects and advantages will be apparent from the following detailed description when considered in conjunction with the accompanying drawing, wherein Fig. 1 is a fragmentary detailed view of a punch and die structure, performing the first combined steps of the method;

Fig. 2 illustrates the members to be welded at the final steps of the method, disposed between welding electrodes of a spot welding machine; and Fig. 3 is a fragmentary sectional view of the welded parts.

Referring now to the drawing, attention is first directed to Fig. 1 which illustrates a die 10 upon which one of the parts to be welded is disposed, this part being identified by reference numeral 11. The particular portion of the member 11 to be welded is positioned over the aperture 12 of the die and in alignment with a punch 14. The punch 14 is supported by a reciprocable head 15, the latter being operated through any suitable means not shown. During the operation of the punch and die, a portion is removed from a high resistance material 16, such as steel, and transferred to the member 11. At the same time a portion 17 is removed from the member 11 to allow for the slug or portion 18. In reality, three different steps occur during this one operation; namely, the removal of the portion 17 from the member 11; second, the removal of the portion 18 from the material or member 16; and third, the transferring of the member 18 to a given position in the member 11, so that it will project downwardly out of the opening.

The purpose of so positioning the slug or member 18 is to cause separation of the members to be welded together; namely, the member 11 and a member of similar material 20. The feature of separating the members 11 from 20 by the aid of the slug or member 18 is illustrated in Fig. 2. By spacing the members in this manner, they being of a low resistance value, will make it necessary for the welding current to pass through the member 18. If the members 11 and 20 should at this position be disposed in engagement with each other, the electrical energy of the welding current may partially or entirely by-pass the slug in travelling between the electrodes 21 and 22. The member 18, therefore, serves two main purposes; one being to space the members 11 and 20 away from each other to limit the welding current to a path through the member 18 and the adjacent portions of the members 11 and 20 and to also interpose a quantity of high resistance material between portions of low resistance materials to make it possible to heat such portions satisfactorily to complete a welding operation. There will be a given pressure applied to one or both of the electrodes 21 and 22, sufficient to move the members 11 and 20 together just prior to the completion of the weld, which has been made possible by the softening of the member 18. The final result is illustrated in Fig. 3, where the members 11 and 20 are securely welded together through the aid of the member 18, the stippled area about the member 18 illustrating the portions fused together during the welding operation.

Through the aid of this method low resistance metals may be welded together as efficiently and with equal rapidity to the welding of high resistance metals.

Although specific improvements of the invention have been shown and described, it will be understood that they are but illustrative and that various modifications may be made therein without departing from the scope and spirit of this invention as defined by the appended claims.

What is claimed is:

1. The method of welding metals together comprising positioning a high specific electrical resistance metallic member on a low specific electrical resistance metallic member, simultaneously punching portions of like contours from the members leaving like apertures therein and forcing the high specific electrical resistance metallic portion into the aperture of the low specific electric resistance metallic member until a part thereof projects a given distance out of the said aperture removing the apertured high specific electrical resistance metallic member, positioning another low specific electrical resistance metallic member adjacent the first low specific electrical resistance metallic member and in contact with the projecting portion whereby said low specific electrical resistance members are initially separated by said projecting portion, and passing an electrical welding current through the said projecting portion in the said aperture and the contacting portions of the said low specific electrical resistance metallic members to cause all the said portions in the path of the current to fuse together.

2. The method of welding metals together comprising positioning a high specific electrical resistance metallic member on a low specific electrical resistance metallic member, simultaneously punching portions of like contours from the members leaving like apertures therein and forcing the high specific electrical resistance metallic portion into the aperture of the low specific electric resistance metallic member until a part thereof projects a given distance out of the said aperture, removing the apertured high specific electrical resistance metallic member, positioning another low specific electrical resistance metallic member adjacent the first low specific electrical resistance metallic member and in contact with the projecting portion whereby said low specific electrical resistance members are initially separated by said projecting portion, passing an electrical welding current through the said projecting portion in the said aperture and the contacting portions of the said low specific electrical resistance metallic members to cause all the said portions in the path of the current to fuse together, and causing relative movement of the low specific electrical resistance elements, when the high specific electrical resistance metallic portion has been softened by the electrical welding current, to move the said members into close engagement with each other.

ROBERT W. ROSENDALE.

REFERENCES CITED

The following references are of record in the file of this patent:

UNITED STATES PATENTS

| Number | Name | Date |
| --- | --- | --- |
| 1,064,338 | Katzinger | June 10, 1913 |
| 1,123,309 | Kicklighter | Jan. 5, 1915 |
| 1,332,394 | Gruber | Mar. 2, 1920 |
| 1,973,986 | Kuhlman | Sept. 18, 1934 |
| 2,151,758 | Gier | Mar. 28, 1939 |

FOREIGN PATENTS

| Number | Country | Date |
| --- | --- | --- |
| 404,923 | Germany | Nov. 1, 1924 |